(12) United States Patent
Ono et al.

(10) Patent No.: US 6,900,754 B2
(45) Date of Patent: May 31, 2005

(54) SIGNAL PROCESSING METHOD FOR USE WITH SCANNING RADAR

(75) Inventors: Daisaku Ono, Kobe (JP); Masayuki Kishida, Kobe (JP)

(73) Assignee: Fujitsu Tem Limited, Hyogo (JP)

( * ) Notice: Subject to any disclaimer, the term of this patent is extended or adjusted under 35 U.S.C. 154(b) by 0 days.

(21) Appl. No.: 10/297,343

(22) PCT Filed: Mar. 15, 2002

(86) PCT No.: PCT/JP02/02519

§ 371 (c)(1),
(2), (4) Date: Nov. 21, 2002

(87) PCT Pub. No.: WO02/075355

PCT Pub. Date: Sep. 26, 2002

(65) Prior Publication Data

US 2003/0142007 A1 Jul. 31, 2003

(30) Foreign Application Priority Data

Mar. 15, 2001 (JP) .......................................... 2001-74610

(51) Int. Cl.$^7$ ........................... G01S 13/93; G01S 7/292
(52) U.S. Cl. ........................ 342/158; 342/70; 342/118; 342/128; 342/146; 342/147; 342/175; 342/195; 342/196; 701/300; 701/301
(58) Field of Search ................................ 180/167–169; 701/300, 301; 342/27, 28, 70, 71–81, 89, 90–103, 118, 127–133, 145–158, 175, 192, 193–197

(56) References Cited

U.S. PATENT DOCUMENTS

| | | | | |
|---|---|---|---|---|
| 5,731,778 A | * | 3/1998 | Nakatani et al. | ............... 342/70 |
| 5,734,344 A | * | 3/1998 | Yamada | ........................ 342/72 |
| 5,751,240 A | * | 5/1998 | Fujita et al. | ................... 342/70 |
| 5,757,307 A | * | 5/1998 | Nakatani et al. | ............... 342/70 |
| 5,793,325 A | * | 8/1998 | Yamada | ........................ 342/70 |
| 5,872,536 A | * | 2/1999 | Lyons et al. | ................... 342/70 |
| 6,249,243 B1 | | 6/2001 | Takagi | |
| RE37,725 E | * | 6/2002 | Yamada | ........................ 342/72 |

FOREIGN PATENT DOCUMENTS

| | | |
|---|---|---|
| EP | 0 773 452 A1 | 5/1997 |
| EP | 0 936 473 A1 | 8/1999 |
| EP | 1 020 736 A2 | 7/2000 |
| EP | 1 045 258 A2 | 10/2000 |
| JP | A-11-183601 A | 7/1999 |
| JP | A-2000-180540 A | 6/2000 |
| JP | A-2000-193744 A | 7/2000 |
| JP | A-2000-193745 A | 7/2000 |

* cited by examiner

Primary Examiner—Bernarr E. Gregory
(74) Attorney, Agent, or Firm—Fogg and Associates, LLC; Laura A. Ryan

(57) ABSTRACT

A method that can locate the center of a target even when the target is a large vehicle, and that, when a plurality of beams are reflected, determines whether the reflected beams are from the same target or not, wherein, of peaks generated based on a radar signal reflected from the target, peaks whose frequencies are substantially the same and whose reception levels are not smaller than a predetermined value are selected and, when a plurality of such peaks are selected, a center angle between the angles of the leftmost and rightmost peaks is obtained, and the thus obtained center angle is taken as an angle representing the target. Further, the plurality of peaks are paired up to detect a distance, relative velocity, and displacement length for each of reflecting points on the target, and when the differences in these values are all within respectively predetermined values, the plurality of peaks are determined as being peaks representing the same target.

14 Claims, 17 Drawing Sheets

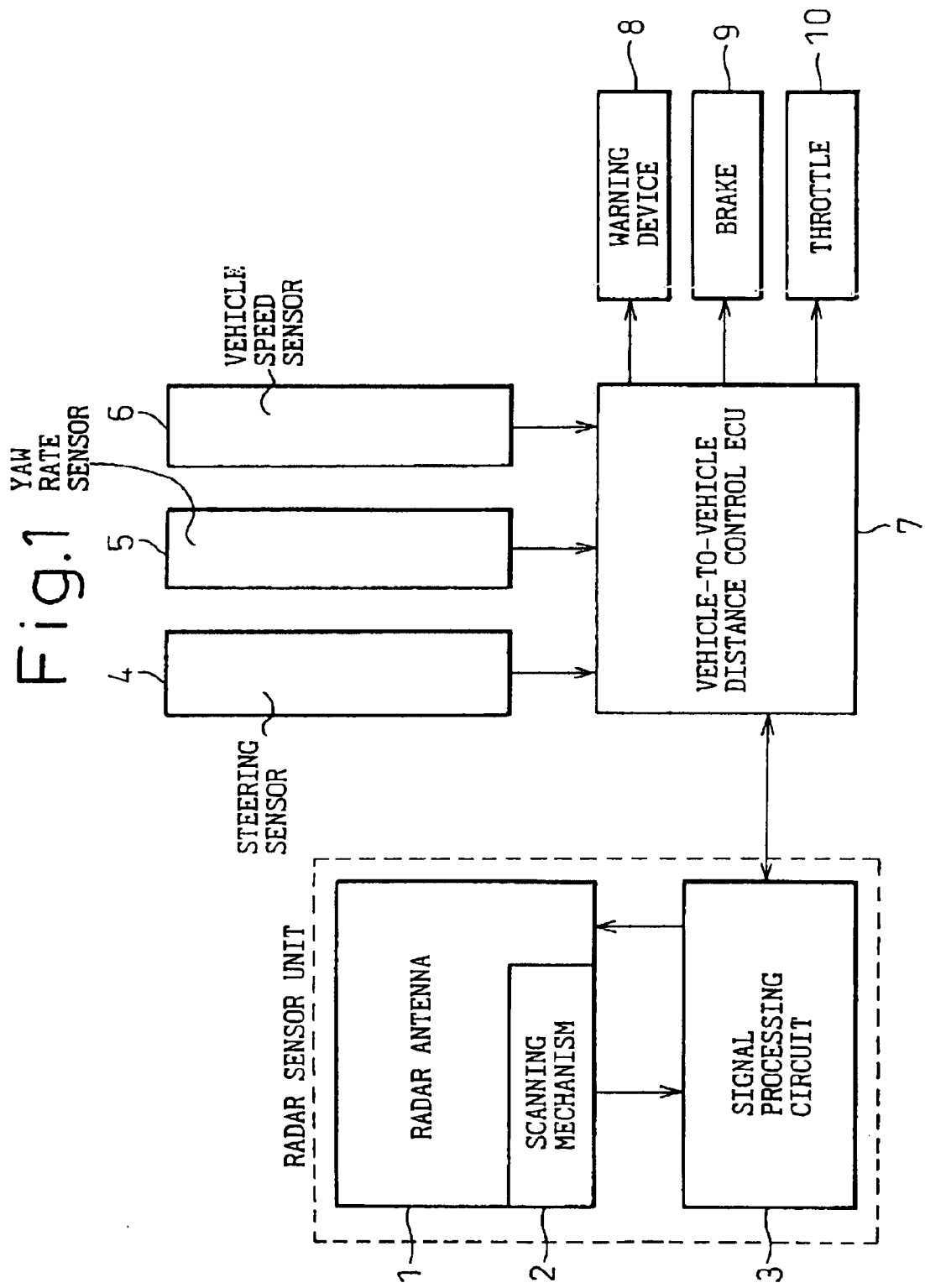

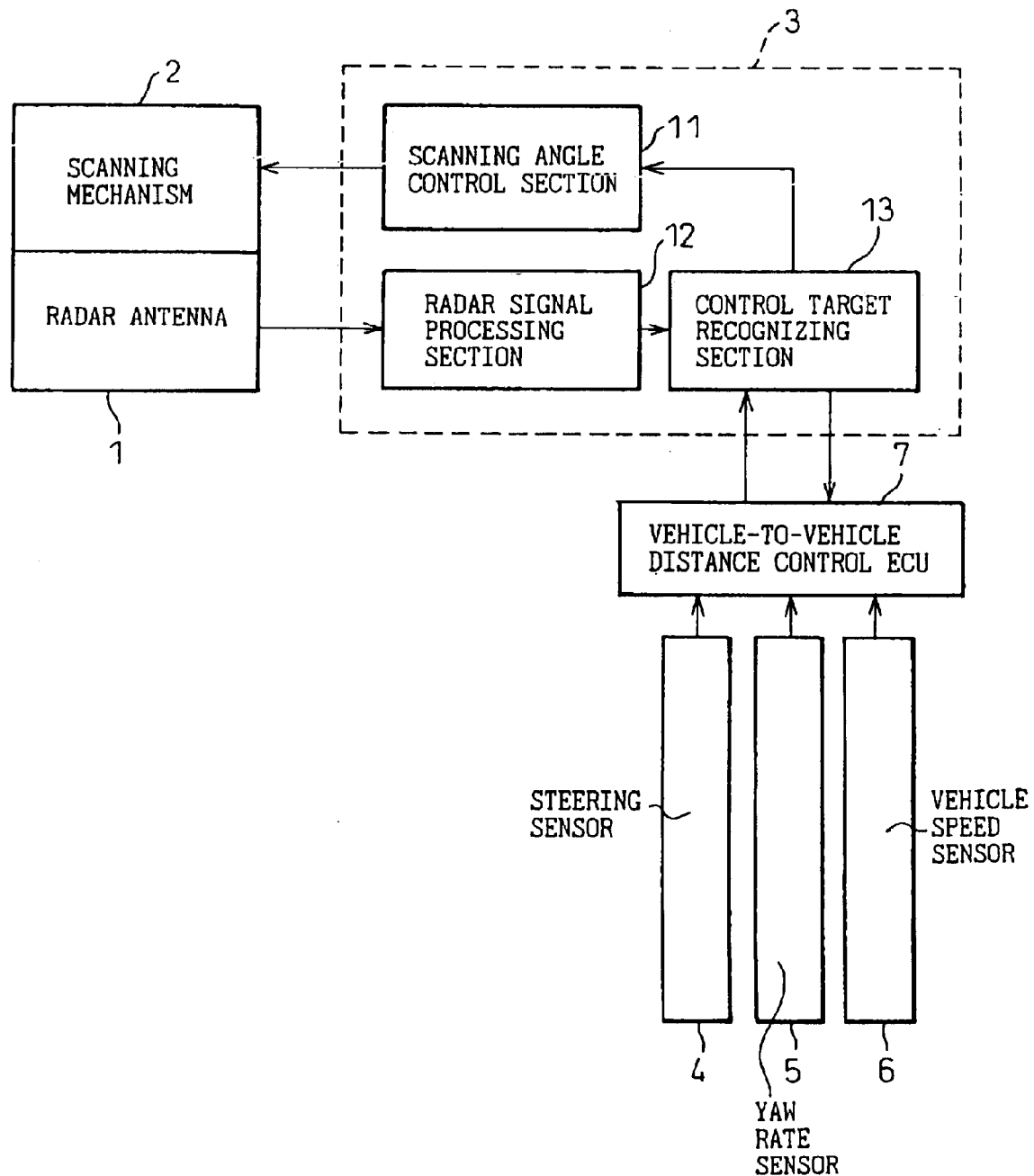

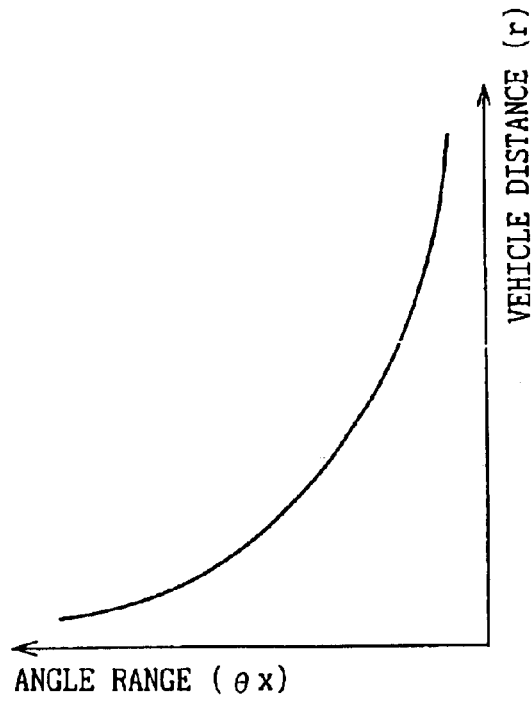
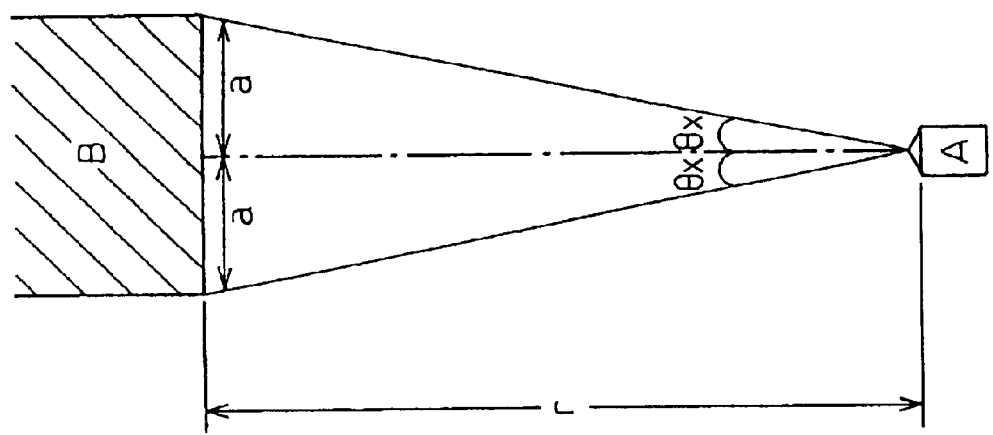

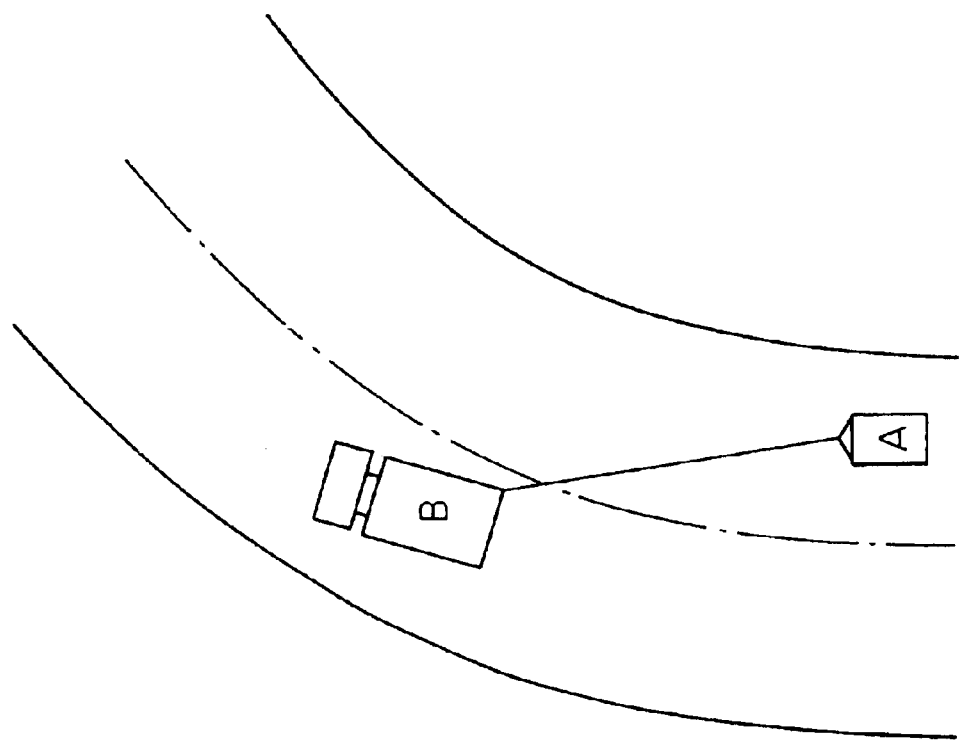
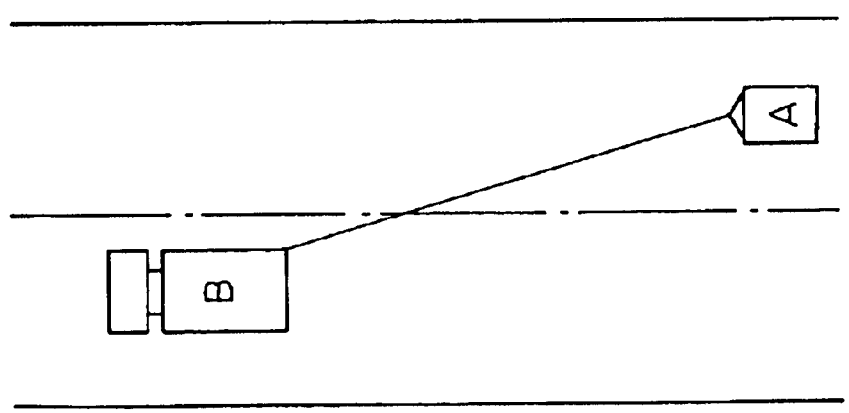

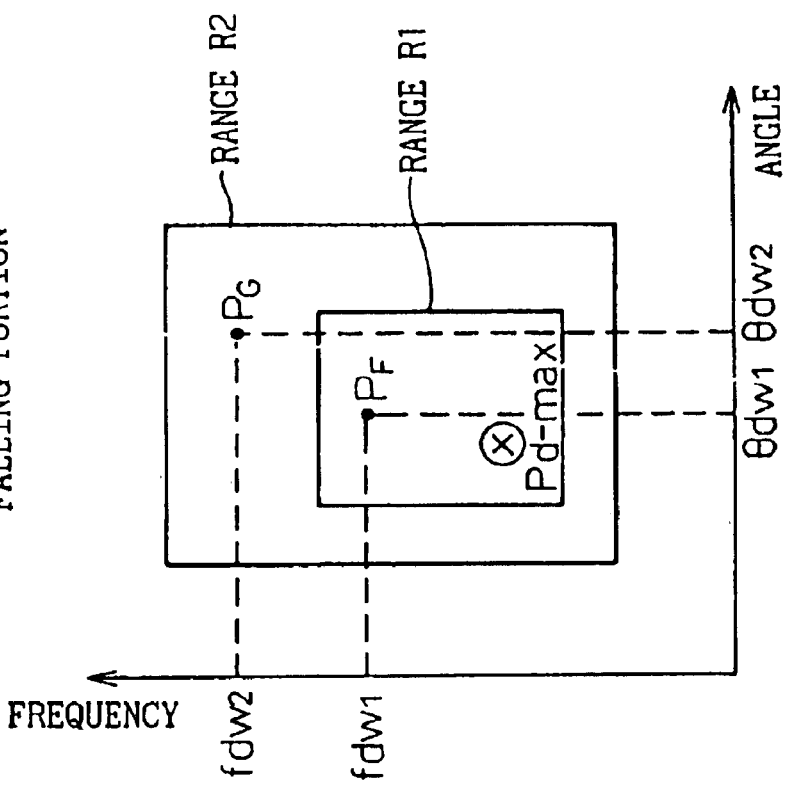
Fig.18A RISING PORTION
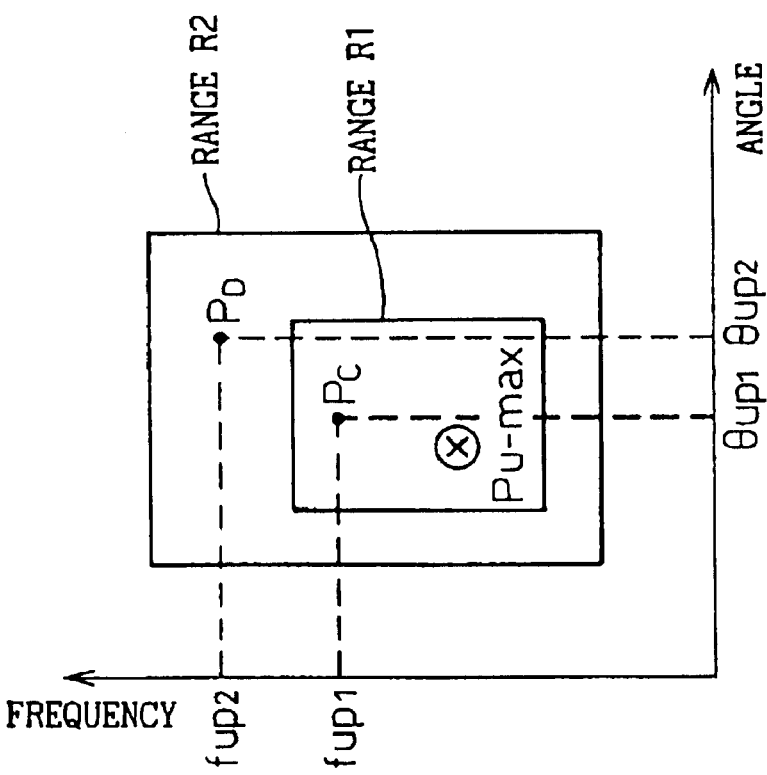
Fig.18B FALLING PORTION

SIGNAL PROCESSING METHOD FOR USE WITH SCANNING RADAR

TECHNICAL FIELD

The present invention relates to a signal processing method, for use with a scanning radar, for processing signals reflected from a plurality of portions of a target when the target is a large vehicle such as a truck.

BACKGROUND ART

For vehicle-to-vehicle distance control, a vehicle-mounted radar system, which projects a radar beam forward and thereby detects an object such as a vehicle traveling ahead, is used. Examples of this type of radar system include FM-CW radar that uses a radio wave such as a millimeter wave and radar that uses laser light. Using such a radar system, the distance and relative velocity with respect to the vehicle ahead and the actual position of the vehicle ahead are detected to control the vehicle-to-vehicle distance. To detect the position of the vehicle traveling ahead, it is important that the approximate center position of the vehicle be detected.

However, when the target vehicle traveling ahead is a large vehicle such as a truck, for example, a number of peaks may appear in the signal reception level when a plurality of transmitted beams are reflected from the target. In such cases, it is often difficult to determine which peak represents the center of the target.

Furthermore, when the target is a large vehicle, the beams reflected from a plurality of differently located parts of the same target may be erroneously recognized as being reflections from different targets. Further, when the large vehicle is traveling in the neighboring lane, the beam that hit a front side mirror or nearby portion of the vehicle is reflected toward the same lane as the radar-equipped vehicle, and this reflection may be erroneously recognized as being a reflection from a vehicle traveling ahead in the same lane as the radar-equipped vehicle.

Further, when beams are reflected from a plurality of differently located parts of the same target, pairing between the peak frequencies in the rising and falling portions of the reflected signal from each of these parts has to be done in order to detect the distance and relative velocity of each of the differently located parts.

Accordingly, an object of the present invention is to make provisions to be able to correctly locate the center of a target even when the target is a large vehicle. Another object of the invention is to make provisions to be able to identify whether reflections arriving at the radar are from the same target or not, even when the target is a large vehicle, or the like, that reflects beams from a plurality of portions thereof. Still another object of the invention is to make provisions so as not to erroneously recognize a vehicle traveling in the neighboring lane as being a vehicle traveling in the same lane as the radar-equipped vehicle. A further object of the invention is to accomplish efficient pairing between the peak signals of the beams reflected from a plurality of different portions of the same target.

DISCLOSURE OF THE INVENTION

To solve the above problems, according to the present invention, there is provided a signal processing method for a scanning radar wherein, of the peaks generated based on a radar signal reflected from a target, peaks whose frequencies are substantially the same and whose reception levels are not smaller than a predetermined value are selected and, when a plurality of such peaks are selected, a center angle between the angles of the leftmost and rightmost peaks is obtained, and the obtained center angle is taken as an angle representing the target.

When the number of selected peaks is two, the angle of a peak located within a predetermined angle range from the larger peak is obtained, and a center angle between the angle of the peak and the angle of the larger peak is obtained and is taken as the angle representing the target.

Here, the center angle is taken, as the angle representing the target, only when the difference between the reception level of the larger peak and the reception level of the peak located within the predetermined angle range from the larger peak is not greater than a predetermined value.

On the other hand, when the difference between the reception level of the larger peak and the reception level of the peak located within the predetermined angle range from the larger peak is greater than the predetermined value, the angle of the larger peak is taken as the angle representing the target.

When the number of selected peaks is three or larger, the center angle is taken as the angle representing the target, only when the difference between the reception level of the largest peak of the three or more peaks and the reception level of each of the remaining peaks is not greater than a predetermined value.

When the number of selected peaks is three or larger, and when the difference between the reception level of the largest peak of the three or more peaks and the reception level of each of the remaining peaks is greater than the predetermined value, the angle of the largest peak is taken as the angle representing the target.

When the number of selected peaks is three or larger, and when the difference between the reception level of the largest peak of the three or more peaks and the reception level of each of a plurality of peaks taken from among the remaining peaks is not greater than a predetermined value, a center angle between the angles of the leftmost and rightmost peaks in a peak group consisting of the largest peak and the plurality of peaks is obtained, and the obtained center angle is taken as the angle representing the target.

According to the present invention, there is also provided a signal processing method for a scanning radar wherein, of the peaks generated based on a radar signal reflected from a target, a plurality of peaks whose frequencies are substantially the same are selected, and pairing is performed on the plurality of peaks to detect a distance, relative velocity, and displacement length for each of reflecting points on the target, and wherein when the differences in the detected distance, relative velocity, and displacement length, existing between the reflecting points, are all within respectively predetermined values, the plurality of peaks are determined as being peaks representing the same target.

Here, of the plurality of peaks, the angle of the peak arising from the reflecting point whose detected distance is the shortest is taken as an angle representing the target.

Further, the same target is determined as being a large vehicle.

When the displacement length is greater than a predetermined value, it is determined that the target is traveling in a neighboring lane.

When it is determined that the target is traveling in a neighboring lane around a curve, a correction is made so that the target is located in the center of the lane.

According to the present invention, there is also provided a signal processing method for a scanning radar wherein, of peaks generated based on a radar signal reflected from a target, peak signals whose reception levels are the largest in rising and falling portions, respectively, of the radar signal are extracted for pairing therebetween, after which peak signals located at equivalent positions in terms of angle and frequency differences relative to the respective peak signals whose reception levels are the largest are extracted from the rising and falling portions, respectively, for pairing therebetween.

Of the peaks generated based on the radar signal reflected from the target, peak signals whose reception levels are the largest in the rising and falling portions, respectively, of the radar signal are extracted for pairing therebetween, a range R1 defined by predetermined frequency and angle ranges containing the frequency and angle of each of the largest peak signals and a range R2 wider than the range 1 are determined, and the ranges R1 and R2 are searched for peaks having substantially the same angle in the rising and falling portions, respectively, wherein when the peaks are located in the range R1, the peaks are paired up if the difference in frequency between the peaks is within a first predetermined range, while when the peaks are located in the range R2, the peaks are paired up if the difference in frequency between the peaks is within a second predetermined range which is smaller than the first predetermined range.

ADVANTAGEOUS EFFECT OF THE INVENTION

According to the present invention, the approximate center position of the target can be located even when there occur a plurality of peaks due to reflected signals. Furthermore, if a plurality of beams are reflected from differently located parts of the same target, as it can be determined whether the reflections are from the same target or not, vehicle control can be performed without erroneously recognizing the number of targets. The invention can also identify whether the target is traveling in the same lane as the radar-equipped vehicle or in a neighboring lane.

When pairing the signals generated by the beams reflected from the differently located parts of the same target, the pairing can be accomplished efficiently and correctly.

BRIEF DESCRIPTION OF THE DRAWINGS

FIG. 1 is a diagram showing an overview of the configuration of a vehicle-to-vehicle distance control system employing the method of the present invention.

FIG. 2 is a diagram showing the configuration of a signal processing circuit 3 of FIG. 1.

FIGS. 9A and 9B are diagrams for explaining how the prescribed angle range is determined.

FIGS. 15A and 15B are diagrams showing a large vehicle traveling ahead in the neighboring lane.

FIGS. 18A and 18B are diagrams for explaining a method of pairing according to the present invention.

DETAILED DESCRIPTION OF THE INVENTION

Figure 3A:
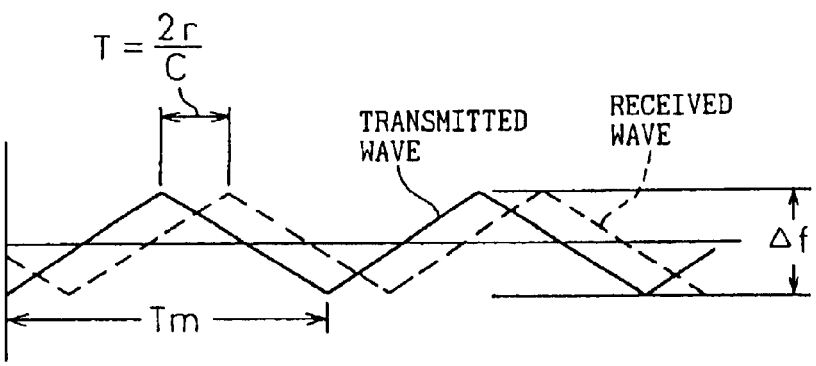
FIGS. 3A to 3C are diagrams for explaining the principle of FM-CW radar when the relative velocity with respect to target is 0.

FIG. 1 is a diagram showing an overview of the configuration of a vehicle-to-vehicle distance control system using a scanning radar in which the method of the present invention is employed. A radar sensor unit is, for example, an FM-CW radar, and includes a radar antenna 1, a scanning mechanism 2, and a signal processing circuit 3. A vehicle-to-vehicle distance control ECU 7 receives signals from a steering sensor 4, a yaw rate sensor 5, and a vehicle speed sensor 6 as well as from the signal processing circuit 3 in the radar sensor unit, and controls a warning device 8, a brake 9, a throttle 10, etc. The vehicle-to-vehicle distance control ECU 7 also sends a signal to the signal processing circuit 3 in the radar sensor unit. The radar to be used here need not necessarily be limited to the FM-CW radar.

FIG. 2 is a diagram showing the configuration of the signal processing circuit 3 of FIG. 1. The signal processing circuit 3 comprises a scanning angle control section 11, a radar signal processing section 12, and a control target recognizing section 13. The radar signal processing section 12 applies an FFT to the reflected signal received by the radar antenna 1, detects the power spectrum, computes the distance and relative velocity of the target, and supplies the resulting data to the control target recognizing section 13. Based on the distance and relative velocity of the target supplied from the radar signal processing section 12, and on vehicle information detected by the steering sensor 4, yaw rate sensor 5, vehicle speed sensor 6, etc. and supplied from the vehicle-to-vehicle distance control ECU 7, the control target recognizing section 13 identifies the control target and supplies the result to the vehicle-to-vehicle distance control ECU, while at the same time, providing a commanded scanning angle to the scanning angle control section 11. The scanning angle control section 11 is one that, in the case of a fixed type radar, controls the beam projection angle, etc.

when the vehicle is traveling around a curve and, in the case of a scanning radar, controls the beam scanning angle. In response to the control signal from the scanning angle control section 11, the scanning control mechanism 2 performs scanning by sequentially projecting the beam at the required angle.

FM-CW radar transmits a continuous wave frequency-modulated, for example, in a triangular pattern, to determine the distance to a target, such as a vehicle, traveling ahead. More specifically, the transmitted wave from the radar is reflected by the vehicle ahead, and the reflected signal is received and mixed with a portion of the transmitted signal to produce a beat signal (radar signal). This beat signal is fast Fourier transformed to analyze the frequency. The frequency-analyzed beat signal exhibits a peak at which the power becomes large in correspondence with the target; the frequency corresponding to this peak is called the peak frequency. The peak frequency carries information concerning the distance, and the peak frequency differs between the rising portion and falling portion of the triangular FM-CW wave due to the Doppler effect associated with the relative velocity with respect to the vehicle ahead. The distance and relative velocity with respect to the vehicle ahead are determined from the peak frequencies in the rising and falling portions. When there is more than one vehicle traveling ahead, a pair of peak frequencies in the rising and falling portions is generated for each vehicle. Forming pairs of peak frequencies in the rising and falling portions is called pairing.

Figure 3B:
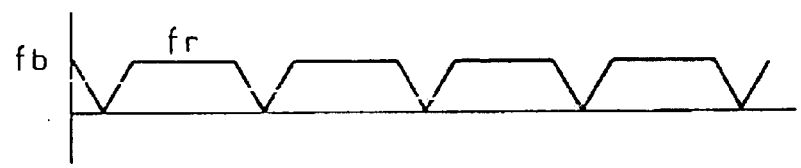
Figure 3C:
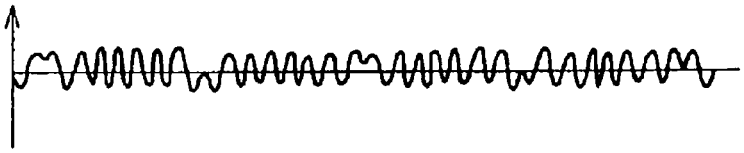

FIGS. 3A to 3C are diagrams for explaining the principle of the FM-CW radar when the relative velocity with respect to the target is 0. The transmitted wave is a triangular wave whose frequency changes as shown by a solid line in FIG. 3A. In the figure, $f_0$ is the transmit center frequency of the transmitted wave, $\Delta f$ is the FM modulation width, and Tm is the repetition period. The transmitted wave is reflected from the target and received by the antenna; the received wave is shown by a dashed line in FIG. 3A. The round trip time T to and from the target is given by T=2r/C, where r is the distance to the target and C is the velocity of radio wave propagation.

Here, the received wave is shifted in frequency from the transmitted signal (i.e., produces a beat) according to the distance between the radar and the target.

The beat signal frequency component fb shown in FIG. 3B can be expressed by the following equation.

$$fb=fr=(4 \cdot \Delta f/C \cdot Tm)r$$

where fr is the frequency due to the range (distance).

Figure 4A:
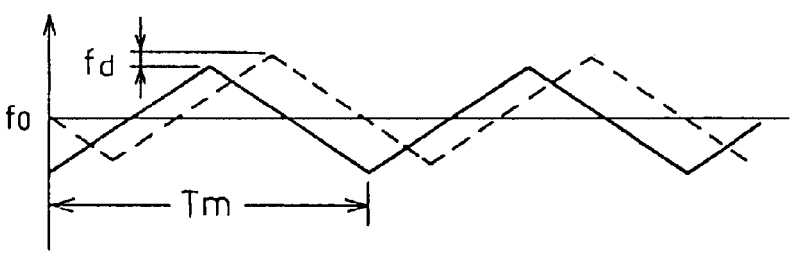
FIGS. 4A to 4C are diagrams for explaining the principle of FM-CW radar when the relative velocity with respect to target is v.
Figure 4B:
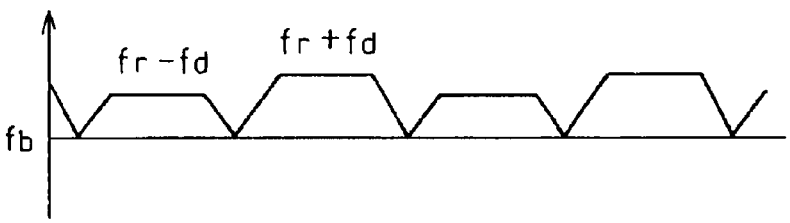
Figure 4C:
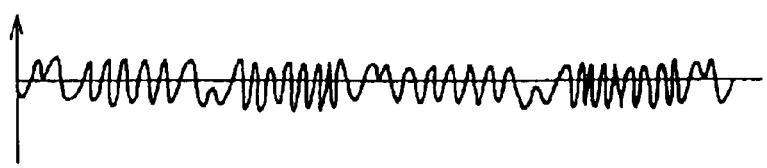

FIGS. 4A to 4C, on the other hand, are diagrams for explaining the principle of the FM-CW radar when the relative velocity with respect to the target is v. The frequency of the transmitted wave changes as shown by a solid line in FIG. 4A. The transmitted wave is reflected from the target and received by the antenna; the received wave is shown by a dashed line in FIG. 4A. Here, the received wave is shifted in frequency from the transmitted signal (i.e., produces a beat) according to the distance between the radar and the target. In this case, as the relative velocity with respect to the target is v, a Doppler shift occurs, and the beat frequency component fb shown in FIG. 4B can be expressed by the following equation.

$$fb=fr\pm fd=(4 \cdot \Delta f/C \cdot Tm)r\pm(2 \cdot f_0/C)v$$

where fr is the frequency due to the distance, and fd is the frequency due to the velocity.

Figure 5:
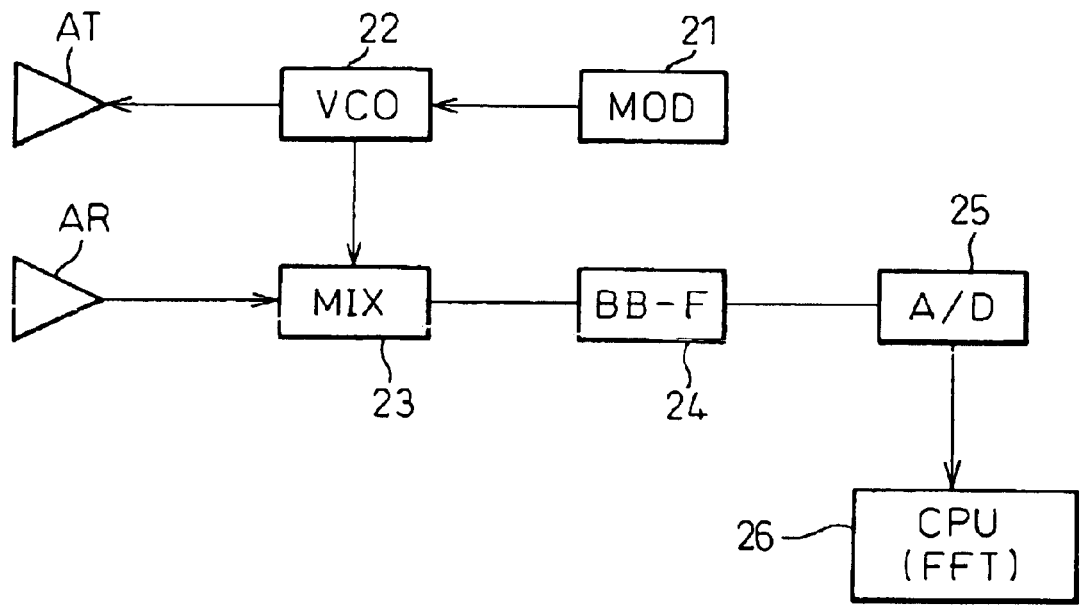
FIG. 5 is a diagram showing an example of the configuration of the FM-CW radar.

FIG. 5 is a diagram showing an example of the configuration of the FM-CW radar. As shown, a modulating signal generator 21 applies a modulating signal to a voltage-controlled oscillator 22 for frequency modulation, and the frequency-modulated wave is transmitted out via the transmitting antenna AT, while a portion of the transmitted signal is separated and directed into a frequency converter 23 which functions like a mixer. The signal reflected from a target, such as a vehicle traveling ahead, is received via the receiving antenna AR, and the received signal is mixed in the frequency converter 23 with the output signal of the voltage-controlled oscillator 22 to produce a beat signal. The beat signal is passed through a baseband filter 24, and is converted by an A/D converter 25 into a digital signal; the digital signal is then supplied to a CPU 26 where signal processing such as fast Fourier transform is applied to the digital signal to obtain the distance and the relative velocity of the target.

[Embodiment 1]

Figure 6:
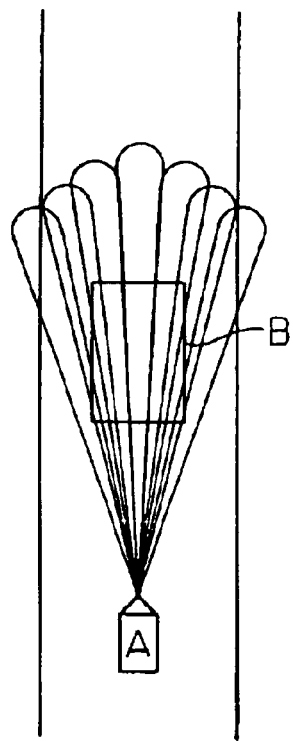
FIG. 6 is a diagram showing the projection of beams when the vehicle traveling ahead is a large vehicle.
Figure 7:
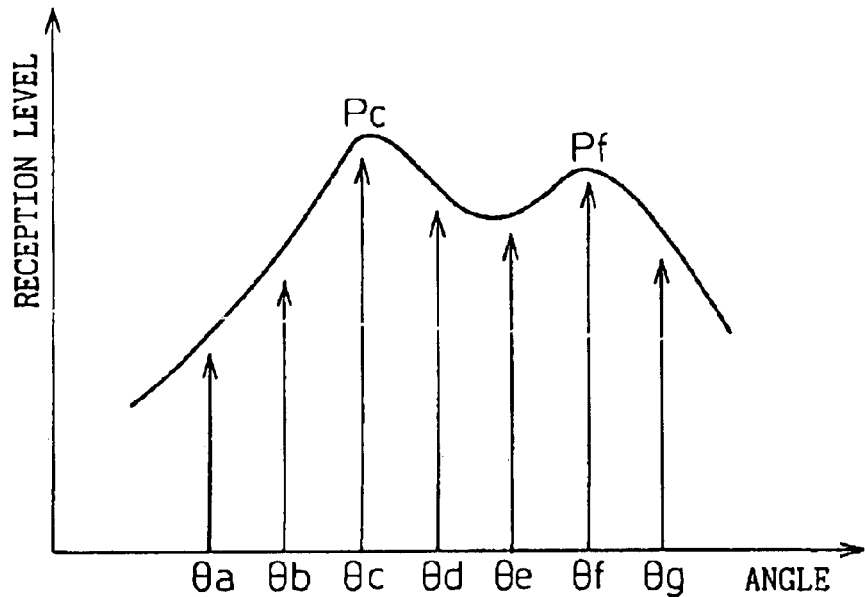
FIG. 7 is a diagram showing peak levels for the beams reflected from the large vehicle.

As shown in FIG. 6, when a vehicle B traveling ahead of the radar-equipped vehicle A is a large vehicle such as a truck, a plurality of beams are reflected from the vehicle B. For example, when beams are projected at angles θa to θg, the reception levels of the peaks occurring due to the beams projected at the angles θa to θg are distributed as plotted in FIG. 7, because reception levels are high and the reflecting area is large in the case of a large reflecting target such as a truck. In this case, the peak frequencies are substantially the same as the distances to various parts of the target are approximately the same. However, the reception level from a large vehicle may exhibit two peaks as shown in FIG. 7. Usually, the angle corresponding to the peak of the reception level is taken as the angle at which the target is located. However, if there are two peaks, as shown here, the peaks may be erroneously recognized as representing two separate targets.

Figure 8:
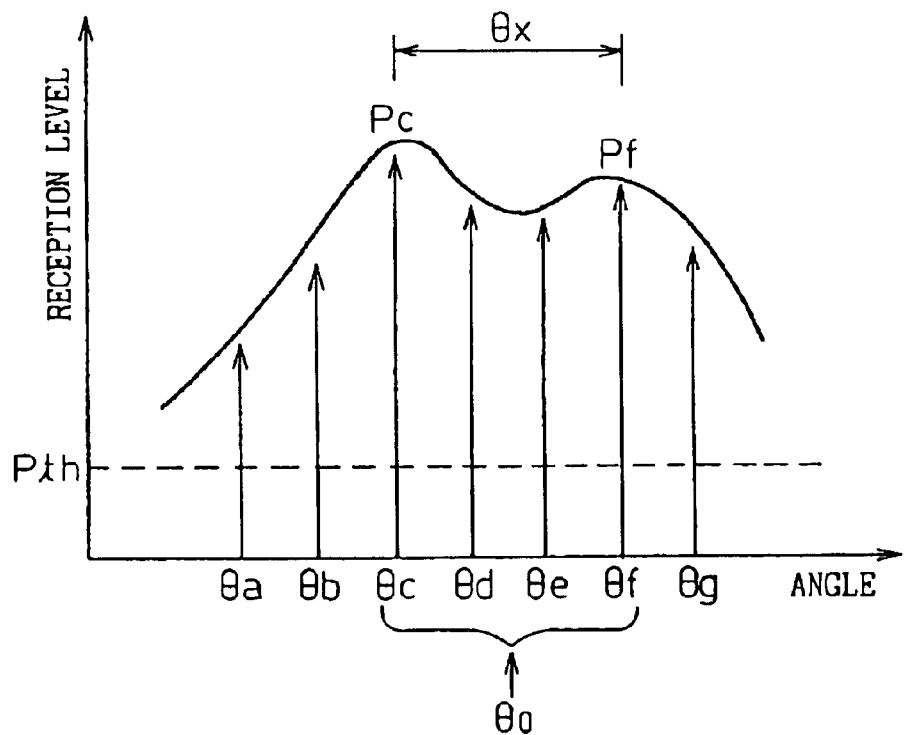
FIG. 8 is a diagram showing an example of how the peaks resulting from the beams reflected from the large vehicle are grouped together within a prescribed angle range.

In view of this, in the present invention, when the reflected signal has peaks whose frequencies are substantially the same and whose reception levels are not smaller than a predetermined value (threshold value), any peak appearing within a prescribed angle range θx from the largest peak is also regarded as representing the same target, and the center angle between the angles of the peaks is taken as the angle representing the target. For example, as shown in FIG. 8, the largest peak Pc and another peak Pf, which is larger than the threshold value Pth and is located within the prescribed angle range θx from the largest peak Pc, are regarded as peaks representing the same target, and the center angle $\theta_0$ of the peaks PC and Pf is taken as the angle representing the target.

However, if the difference in reception level between the peaks is too large, there is a possibility that the peaks may not represent the same target, and even if they do represent the same target, the smaller peak may be one representing a portion other than the major portion of the target; in that case, the center angle is less likely to represent the center portion of the target. In view of this, in the present invention, only a peak whose reception level is not smaller than that of the largest peak by more than a predetermined value is regarded as a peak of the signal reflected from the same target, and the center angle of these peaks is taken as the angle representing the target. More specifically, in FIG. 8, only when the difference in reception level between the largest peak PC and another peak Pf is not greater than the predetermined value AP, that is, when $$Pc-Pf \leq \Delta P$$

the peaks are regarded as representing the same target, and the center angle of these peaks is taken as the angle representing the same target.

On the other hand, when the difference in reception level between the largest peak Pc and the other peak Pf is greater than the predetermined value ΔP, the peaks cannot always be regarded as representing the same target; in this case, therefore, the angle of the largest peak is taken as the angle representing the target.

Next, the method of determining the prescribed angle range will be described with reference to FIGS. 9A and 9B. In FIG. 9A, reference character A is the radar-equipped vehicle and B is the vehicle traveling ahead. When the distance to the vehicle B is r, and the width of the vehicle is 2a, the following equation holds.

$$\tan \theta x = a/r$$

where θx is the angle of the beam projected to the position displaced from the center of the vehicle B by a distance "a" to the right or the left, respectively.

Hence $$\theta x = \tan^{-1} a/r$$

The angular range thus changes with the vehicle distance. A graph illustrating this change is shown in FIG. 9B.

Figure 10:
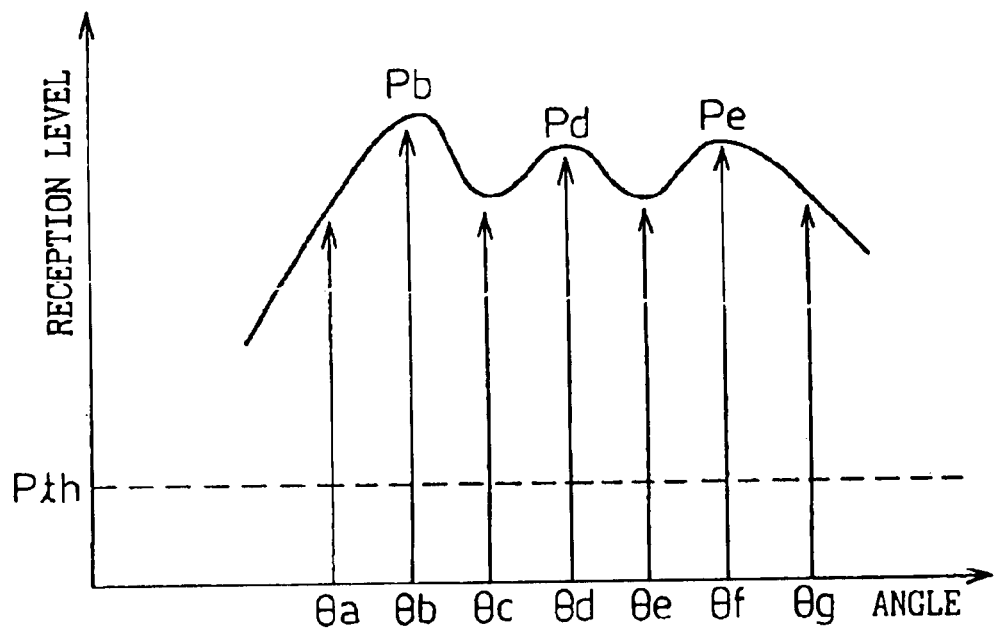
FIG. 10 is a diagram for explaining how the angle of the target is determined when there are three or more peaks.

The above description has dealt with the case of two peaks. On the other hand, when there are three or more peaks whose frequencies are substantially the same and whose reception levels are not smaller than the predetermined value, for example, when there are three peaks Pb, Pd, and Pe larger than the threshold value, as shown in FIG. 10, the center angle between the angle of the leftmost peak Pb and the angle of the rightmost peak Pe is taken as the angle representing the target.

Figure 11:
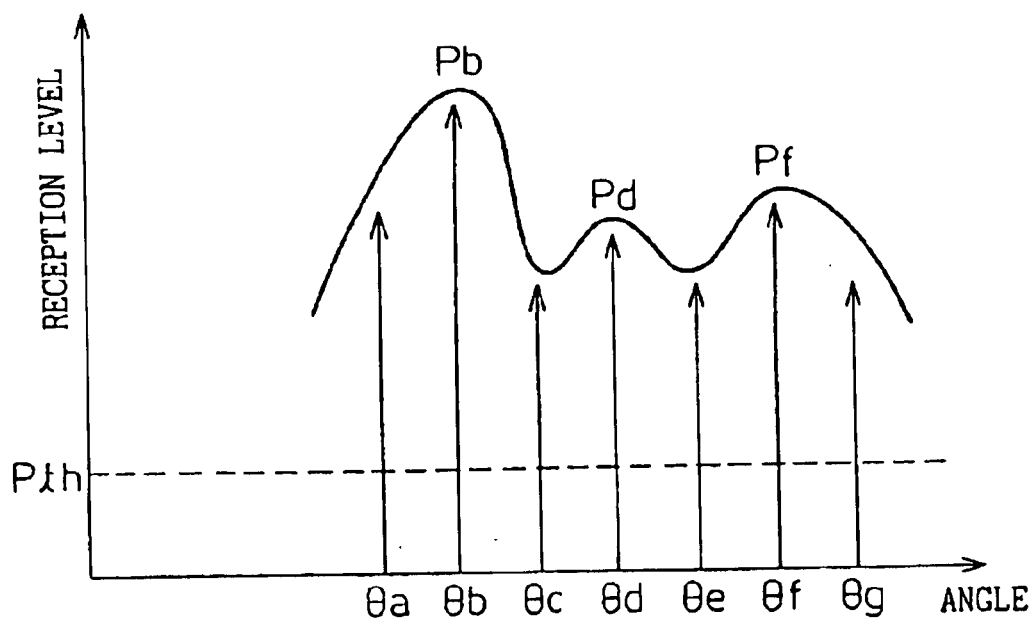
FIG. 11 is a diagram for explaining how the angle of the target is determined when the difference between the largest peak and another peak is large.

Further, as shown in FIG. 11, when the difference between the largest peak Pb and each of the other peaks Pd and Pf is greater than the predetermined value, that is, $$Pb-Pd>\Delta P$$

$$Pb-Pf>\Delta P$$

the angle θb of Pb is taken as the angle representing the target.

On the other hand, when the difference in reception level between the largest peak Pb and either one of the other peaks, Pd or Pf, is not greater than the predetermined value, the center angle between the angle of the leftmost peak Pb and the angle of the rightmost peak Pd or Pf is taken as the angle representing the target. Further, when there are a plurality of peaks, and when some, but not all, of the peaks other than the largest peak have reception levels each of which is not smaller than the reception level of the largest peak by more than the predetermined value, the center angle between the angles of the leftmost and rightmost peaks in the peak group consisting of the largest peak and those some of the peaks is taken as the angle representing the target.

[Embodiment 2]

In the case of a large vehicle such as a truck, as beams are reflected from a plurality of differently located parts, there may arise differences between the frequencies of the beat signals produced based on the reflected signals. In particular, when the large vehicle such as a truck is traveling in the neighboring lane, the beam that hits a front side mirror or nearby portion of the vehicle is reflected toward the same lane as the radar-equipped vehicle, and this reflection may be erroneously recognized as being a reflection from a vehicle traveling ahead in the same lane as the radar-equipped vehicle and may affect vehicle control operations such as vehicle-to-vehicle distance control. In view of this, the present invention utilizes the positional relationship between the reflection from the rear of the large vehicle and the reflection from the front side mirror or nearby portion of the vehicle, and determines that both reflections are from the large vehicle traveling in a neighboring lane.

Figure 12:
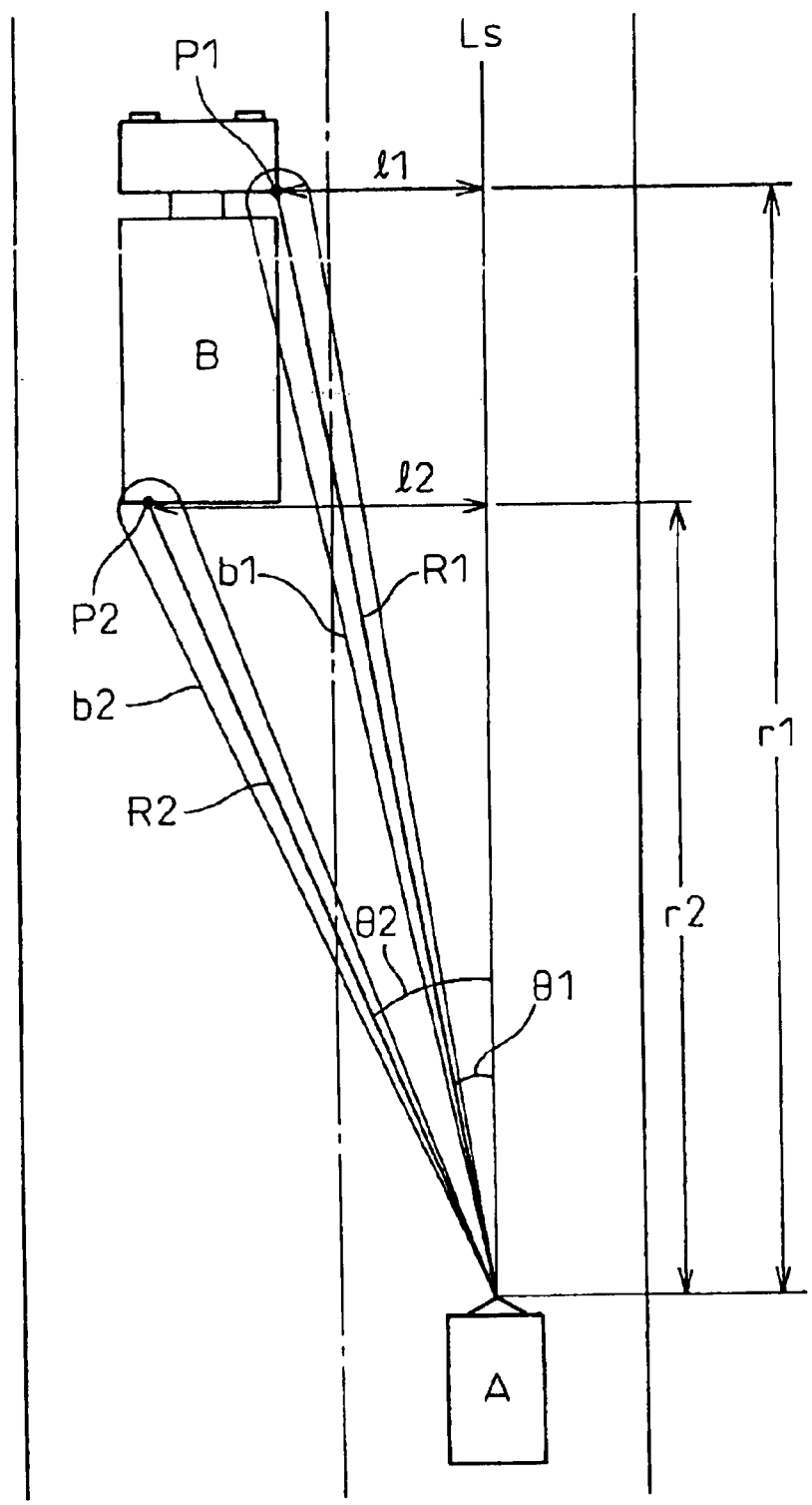
FIG. 12 is a diagram showing a large vehicle traveling in a neighboring lane on a straight road.

FIG. 12 shows the radar-equipped vehicle A traveling on a straight road and the large vehicle B traveling ahead in the neighboring lane. In the illustrated example, it is assumed that beams are projected from the radar-equipped vehicle A to the large vehicle B, and that one of the beams is reflected from a point P1 near a mirror of the target vehicle B and another beam from a point P2 on the rear of the vehicle B. In this case, the peak frequencies based on the beams reflected from P1 and P2, respectively, are different but are approximately the same as the distance between these points is close. Here, peaks having approximately the same frequency are selected from the rising portion and falling portion, respectively, and the plurality of peaks are paired up between the rising portion and the falling portion. Then, the distances to the respective points P1 and P2, their relative velocities, and their displacement lengths, are detected. The thus detected distances to the points P1 and P2 in the traveling direction of the radar-equipped vehicle A are denoted by r1 and r2, respectively, and the relative velocities of the points P1 and P2 with respect to the radar-equipped vehicle A are denoted by v1 and v2, respectively, while the lengths of the perpendiculars (the lengths of the displacements) drawn from the points P1 and P2 to a straight line Ls extending along the traveling direction of the radar-equipped vehicle A are designated by l1 and l2, respectively. Then, in the present invention, when (1) the difference between the distances (r1−r2) is within a predetermined range, for example, within the length of the truck, that is, $$r1-r2 \leq \Delta r$$

(2) the difference between the relative velocities (v1−v2) is within a predetermined range, that is, $$v1-v2 \leq \Delta V (\Delta V \approx 0)$$

and (3) the difference between the lengths of the perpendiculars (l1−l2) is within a predetermined range, for example, within the width of the truck, that is, $$l1-l2 \leq \Delta l$$

then it is determined that the two peaks are due to the reflections from the same target. Here, data detected from the peak of the signal reflected from the farther point, for example, the point P1, is not output, and the beam angle of the other peak is taken as the peak representing the target. In other words, the angle of the peak occurring due to the reflection from the point whose detected distance is the shortest is taken as the peak representing the target. By so doing, the position of the control target can be located.

On the other hand, with the above conditions (1) to (3) only, it is not known whether the vehicle B is traveling in the neighboring lane or in the same lane as the radar-equipped vehicle. Therefore, when (4) the value of l1 or l2 is larger than a predetermined value (for example, the lane width), it is determined that the target is traveling in the neighboring lane.

Here, a description will be given of how l1, l2 and r1, r2 are determined. When the angle that the beam b1 projected to the point P1 on the vehicle B makes with the traveling direction Ls of the radar-equipped vehicle A is θ1, the distance to the point P1 is R1, the angle that the beam b2 projected to the point P2 makes with the traveling direction Ls of the radar-equipped vehicle A is θ2, and the distance to the point P2 is R2, then $$\sin θ1 = l1/R1, \text{ hence } l1 = R1 \sin θ1$$

$$\sin θ2 = l2/R2, \text{ hence } l2 = R2 \sin θ2$$

and $$\cos θ1 = r1/R1, \text{ hence } r1 = R1 \cos θ1$$

$$\cos θ2 = r2/R2, \text{ hence } r2 = R2 \cos θ2$$

Figure 13:
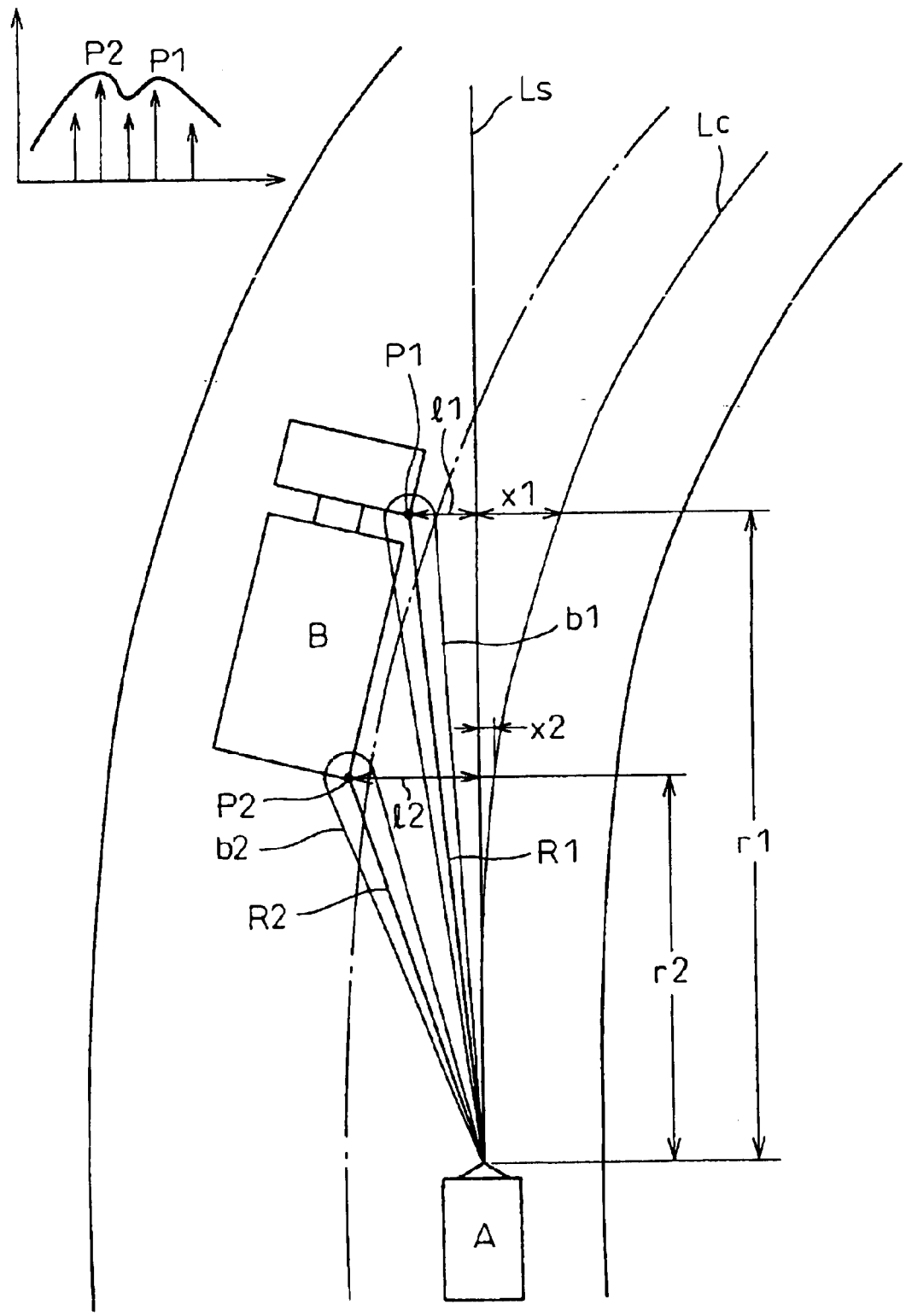
FIG. 13 is a diagram showing a large vehicle traveling in a neighboring lane around a curve.

FIG. 13 shows the radar-equipped vehicle A traveling around a curve and the large vehicle B traveling ahead in a neighboring lane. In the illustrated example, as in the example of FIG. 12, it is assumed that beams are projected from the radar-equipped vehicle A to the large vehicle B, and that one of the beams is reflected from point P1 near a mirror of the target vehicle B and another beam from point P2 on the rear of the vehicle B. Here, the distances of the points P1 and P2 along the extended line Ls in the traveling direction of the radar-equipped vehicle A are denoted by r1 and r2, respectively, and the relative velocities of the points P1 and P2 with respect to the radar-equipped vehicle A are denoted by v1 and v2, respectively, while the lengths of the perpendiculars drawn from the points P1 and P2 to the straight line Ls extending along the traveling direction of the radar-equipped vehicle A are denoted by 11 and 12, respectively, and the lengths of the lines extended from the points where 11 and 12 intersect with the straight line Ls to the points where they intersect with a curved line Lc along which the radar-equipped vehicle is expected to travel are denoted by x1 and x2, respectively. Then, in the present invention, as in the example of FIG. 12, when (1) the difference between the distances (r1−r2) is within a predetermined range, that is, $$r1 - r2 \leq \Delta r$$

(2) the difference between the relative velocities (v1−v2) is within a predetermined range, that is, $$v1 - v2 \leq \Delta V$$

and (3) the difference between the lengths of the perpendiculars (l1+x1) and (l2+x2) (the lengths of the displacements) is within a predetermined range, that is, $$|(l1+x1)-(l2+x2)| \leq \Delta L$$

then it is determined that the two peaks are due to the reflections from the same target. Here, if P1 is located inward within the curve with respect to P2, P1 is removed and is not output, and only P2 is output by determining the angle of P2 as representing the position of the target for control.

On the other hand, with the above conditions (1) to (3) only, it is not known whether the vehicle B is traveling in the neighboring lane or in the same lane as the radar-equipped vehicle. Therefore, when (4) the value of (l1+x1) or (l2+x2) is larger than a predetermined value (for example, the lane width)

it is determined that the target is traveling in the neighboring lane.

Figure 14:
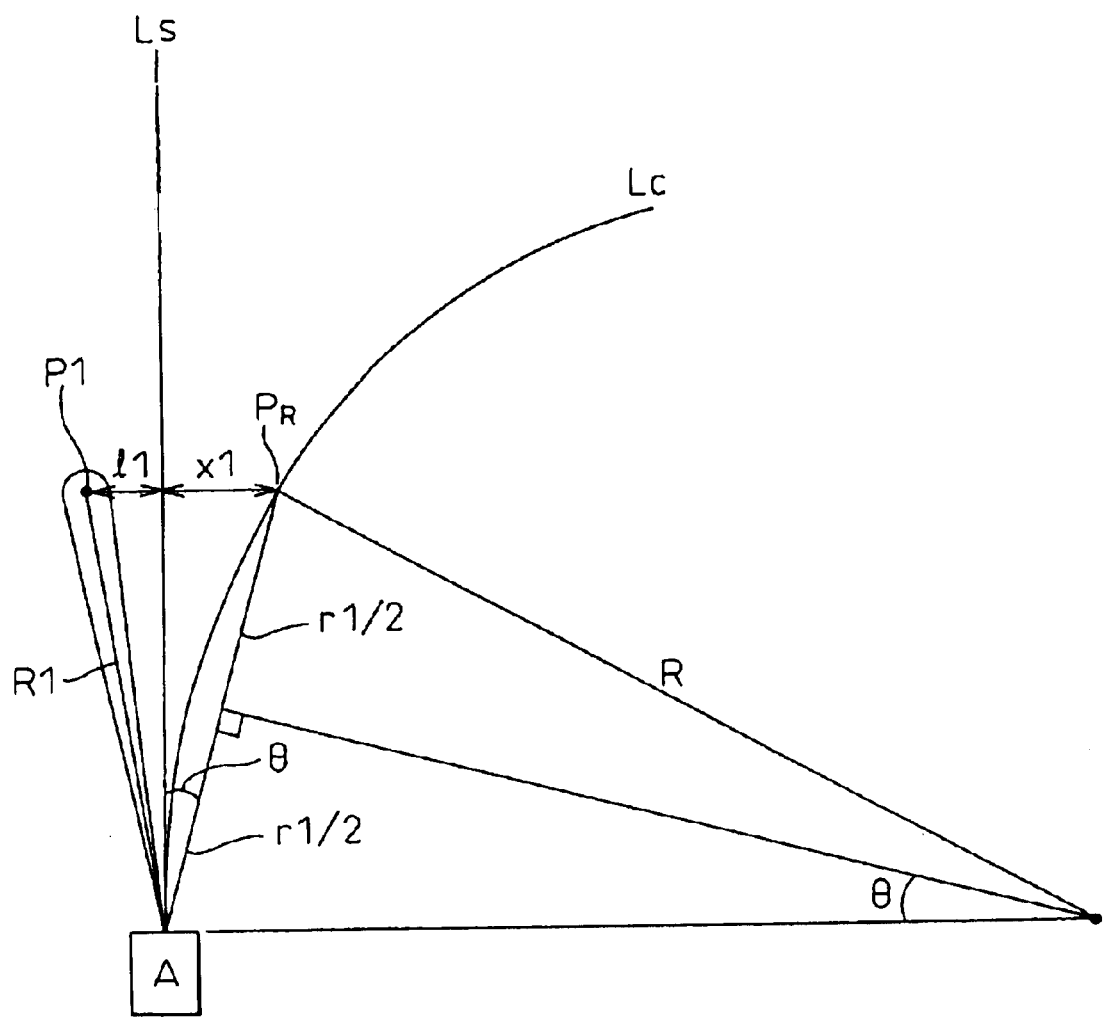
FIG. 14 is a diagram for calculating the degree to which the vehicle traveling in the neighboring lane around the curve is displaced in the lateral direction from the centerline of the lane in which the radar-equipped vehicle is traveling.

The method of obtaining 11, 12 and r1, r2 has already been described, so the method of obtaining x1 and x2 will be described below with reference to FIG. 14. When the radius of the curve is denoted by R, and the angle that the line joining the radar-equipped vehicle A to the point $P_R$ where the extended line of the perpendicular drawn from the point P1 to the straight line Ls extending in the traveling direction intersects with the curved line Lc of radius R makes with the straight line Ls is denoted by θ, then, as the length of the line joining the radar-equipped vehicle A to the point $P_R$ is approximately equal to r1, the following equation holds.

$$\sin θ = (r1/2)/R = r1/2R$$

On the other hand, $$\sin θ = x1/r1,$$

$$x1 = r1 \sin θ = r1 \times r1/2R = r1^2/2R \approx R1^2/2R$$

(r1≈R1)

Here, x2 can be obtained in a similar manner.

FIGS. 15A and 15B are diagrams showing a large vehicle such as a truck traveling in a neighboring lane ahead of the radar-equipped vehicle. FIG. 15A shows the vehicles traveling on a straight road, while FIG. 15B shows the vehicles traveling around a curve. When traveling around a curve, as shown in FIG. 15, a large vehicle such as a truck tends to move nearer to the inside line of the lane as shown than when it is traveling on a straight road as shown in FIG. 15A. In view of this, in the present invention, when the target is a large vehicle or the like traveling around a curve, a correction is made so that the target is located in the center of the curved lane. This correction is accomplished by correcting the angle θ indicating the position of the target; more specifically, the closer the radar-equipped vehicle A is to the vehicle B traveling ahead, the greater the correction angle θ is made.

Figure 16B:
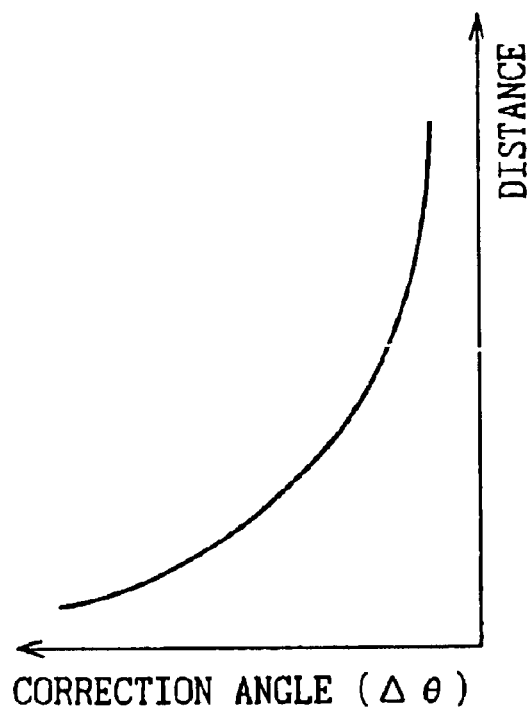
FIGS. 16A and 16B are diagrams showing how a correction is made to the position of the vehicle traveling in the neighboring lane.
Figure 16A:
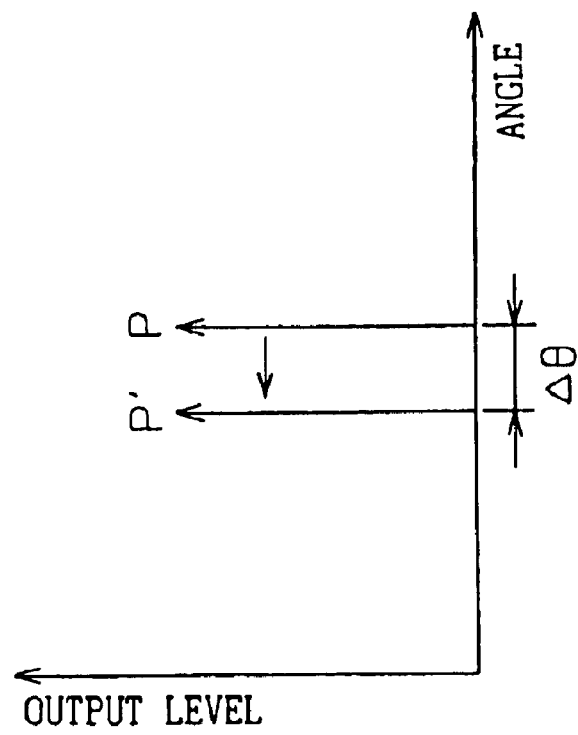

FIGS. 16A and 16B are diagrams showing how the correction is made. FIG. 16A shows that the angle of the peak P of the reflected signal from the target is corrected by Δθ toward the center of the lane to shift it to the position P'. Here, Δθ is varied as shown in FIG. 16B as a function of the distance to the vehicle ahead. That is, the correction angle Δθ is reduced as the distance increases.

[Embodiment 3]

FM-CW radar transmits a triangular-shaped frequency-modulated continuous wave to determine the distance to a target such as a vehicle traveling ahead. More specifically, the transmitted wave from the radar is reflected by the vehicle ahead, and a beat signal (radar signal) occurring between the received reflected wave signal and the transmitted signal is obtained. This beat signal is fast Fourier transformed to analyze the frequency. The frequency-analyzed beat signal exhibits a peak at which the power becomes large in correspondence with the target; the frequency corresponding to this peak is called the peak frequency. The peak frequency carries information concerning the distance, and the peak frequency differs between the rising portion and falling portion of the triangular FM-CW wave due to the Doppler effect associated with the relative velocity with respect to the vehicle ahead. The distance and relative velocity with respect to the vehicle ahead are determined from the peak frequencies in the rising and falling portions. When there is more than one vehicle traveling ahead, a pair of peak frequencies in the rising and falling portions is generated for each vehicle. Forming pairs of peak frequencies in the rising and falling portions is called pairing.

Figure 17A:
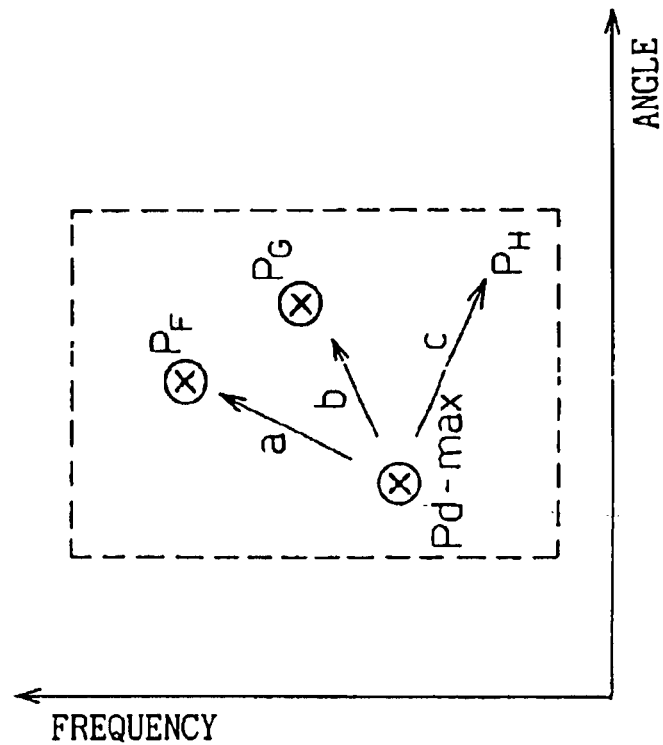
FIGS. 17A and 17B are diagrams for explaining a method of pairing according to the present invention.
Figure 17B:
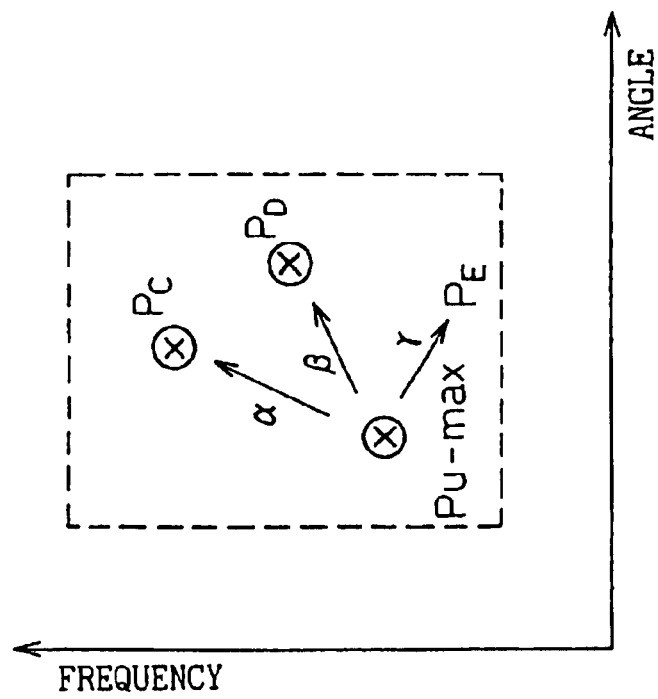

When the target is a large vehicle such as a truck, a plurality of beams are reflected from the target and, as previously shown in FIGS. 12 and 13, the distances to the respective reflecting points differ depending on their positions on the vehicle. As a result, the distance and the relative velocity must be detected for each reflecting point by pairing the signals between the rising and falling portions based on the beam reflected from the same reflecting point. Referring to FIGS. 17A and 17B, a description will be given below of how pairing is done according to the present invention. FIGS. 17A and 17B are graphs in which the angle of the peak of the signal reflected from the target is plotted as abscissa and the peak frequency as ordinate.

(1) First, of the signals generated based on the beams reflected from the same target, the signals whose reception levels are the largest (Pmax) in the rising portion and falling portion, respectively, are extracted for pairing. That is, of the signals in the rising portion shown in FIG. 17A, the maximum level signal Pu-max is extracted, and likewise, in the falling portion shown in FIG. 17B, the maximum level signal Pd-max is extracted. Then, Pu-max and Pd-max are paired together.

(2) Next, peak signals located at equivalent positions in terms of angle and frequency differences relative to Pmax are extracted from the rising portion and falling portion, respectively. For example, with α denoting the vector from Pu-max to peak $P_C$ in the rising portion and "a" denoting the vector from Pd-max to peak $P_F$ in the falling portion, if α≈a, then $P_C$ and $P_F$ are paired up by determining them as being signals generated based on the beams reflected from the same point.

(3) $P_D$ and $P_G$, if β≈b, are paired up by determining them as being signals generated based on the beams reflected from the same point.

(4) For $P_E$ and $P_M$, since γ≠c, pairing according to the above method is not applied, but the usual pairing is done.

Figure 19:
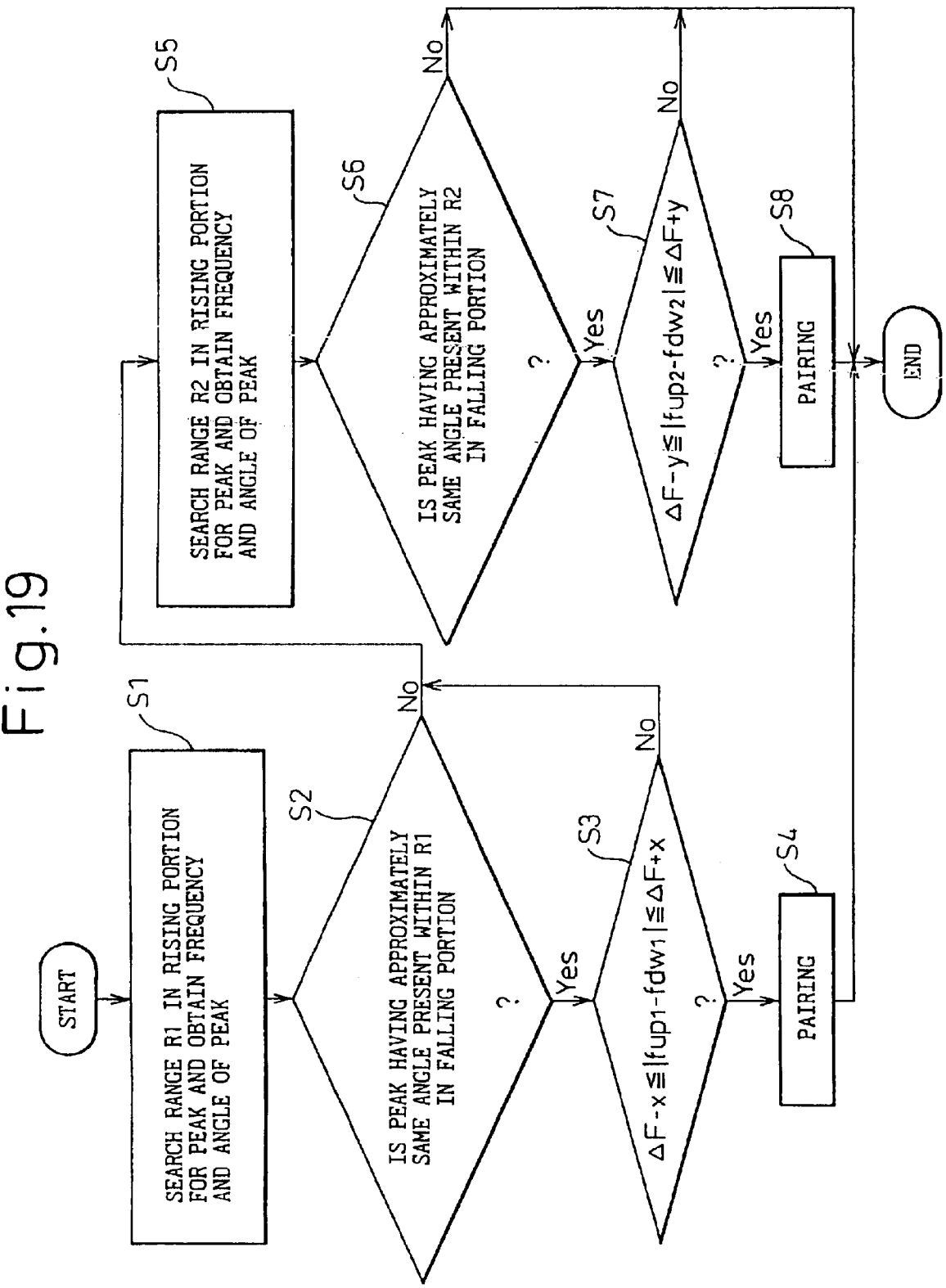
FIG. 19 is a flowchart illustrating the method of pairing shown in FIGS. 18A and 18B.

Next, a method for accomplishing more accurate pairing in the pairing explained with reference to FIGS. 17A and 17B will be described by referring to the graphs of FIGS. 18A and 18B and the flowchart of FIG. 19.

In FIGS. 18A and 18B, the angle is plotted on the abscissa and the frequency on the ordinate. Of the signals in the rising portion shown in FIG. 18A, the maximum level signal Pu-max is extracted, and is paired with the maximum level signal Pd-max extracted from the falling portion shown in FIG. 18B.

In FIGS. 18A and 18B, a range R1 and a range R2 wider than the range R1 are defined for each of Pu-max and Pd-max; first, the range R1 in the rising portion is searched to find if there is any peak therein and, if there is a peak, the frequency $f_{up1}$ and angle $θ_{up1}$ of that peak are obtained (S1), and the peak is plotted as $P_C$ as shown in FIG. 18A.

Here the ranges R1 and R2 are defined appropriately.

Next, it is determined whether a peak having approximately the same angle as $P_C$ is present within the range R1 in the falling portion (S2); if there is such a peak (Yes), the frequency $f_{dw1}$ of that peak $P_F$ is obtained. Then, it is determined whether the difference between $f_{up1}$ and $f_{dw1}$ lies within the following range (S3).

$$ΔF-x ≤ |f_{up1}-f_{dw1}| ≤ ΔF+x$$

In the above expression, ΔF is the frequency difference between Pu-max and Pd-max, and x is a constant. This expression means that the difference between $f_{up1}$ and $f_{dw1}$ that is greater than the frequency difference between Pu-max and Pd-max is permitted. That is, in the case of the peaks contained in the range R1, correct pairing can be accomplished even if the difference between $f_{up1}$ and $f_{dw1}$ is somewhat larger than ΔF. In the above expression, the value of x is appropriately set within a range in which correct pairing can be done.

If the condition shown in the above expression is satisfied (Yes), $P_C$ and $P_F$ are paired up (S4).

If the answer to S2 or S3 is No, the range R2 in the rising portion is searched to find if there is any peak therein other than the peak found in the range R1 and, if there is a peak, the frequency $f_{up2}$ and angle $θ_{up2}$ of that peak are obtained (S5), and the peak is plotted as $P_D$ as shown in FIG. 18A.

Next, it is determined whether a peak having approximately the same angle as $P_D$ is present within the range R2 in the falling portion (S6); if there is such a peak (Yes), the frequency $f_{dw2}$ of that peak $P_G$ is obtained. Then, it is determined whether the difference between $f_{up2}$ and $f_{dw2}$ lies within the following range (S7).

$$ΔF-y ≤ |f_{up2}-f_{dw2}| ≤ ΔF+y$$

Here, y is a constant, as is x. However, in this case, as the peaks contained in the range R2 wider than the range R1 are combined for pairing, the condition is made more severe than when the peaks contained in the range R1 are combined; hence, y<x. This serves to avoid erroneous pairing even when the peaks contained in the wider range R2 are combined.

If the condition shown in the above expression is satisfied (Yes), $P_D$ and $P_G$ are paired up (S8).

If the answer to S6 or S7 is No, the process is terminated without doing the pairing.

The above embodiments have been described for the case where the target is a large vehicle, but it should be understood that the target that gives rise to a plurality of peaks in the reception level is not limited to a large vehicle. It should also be noted that the target that reflects beams from differently located parts is not limited to a large vehicle. Accordingly, in the present invention, the target is not limited to a large vehicle.

[Embodiment 4]

Figure 20A:
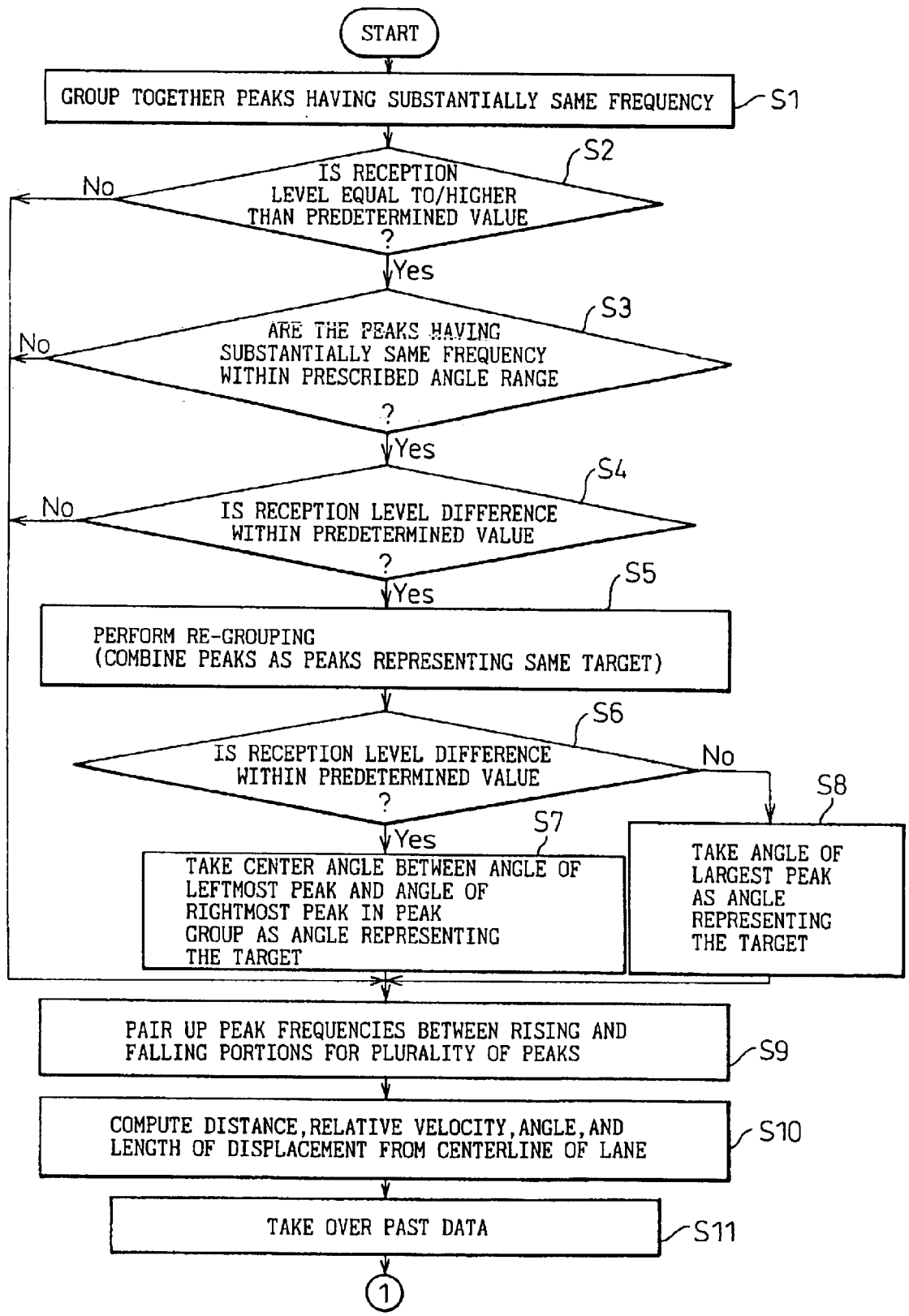
FIGS. 20A and 20B are a flowchart illustrating an embodiment of the present invention.
Figure 20B:
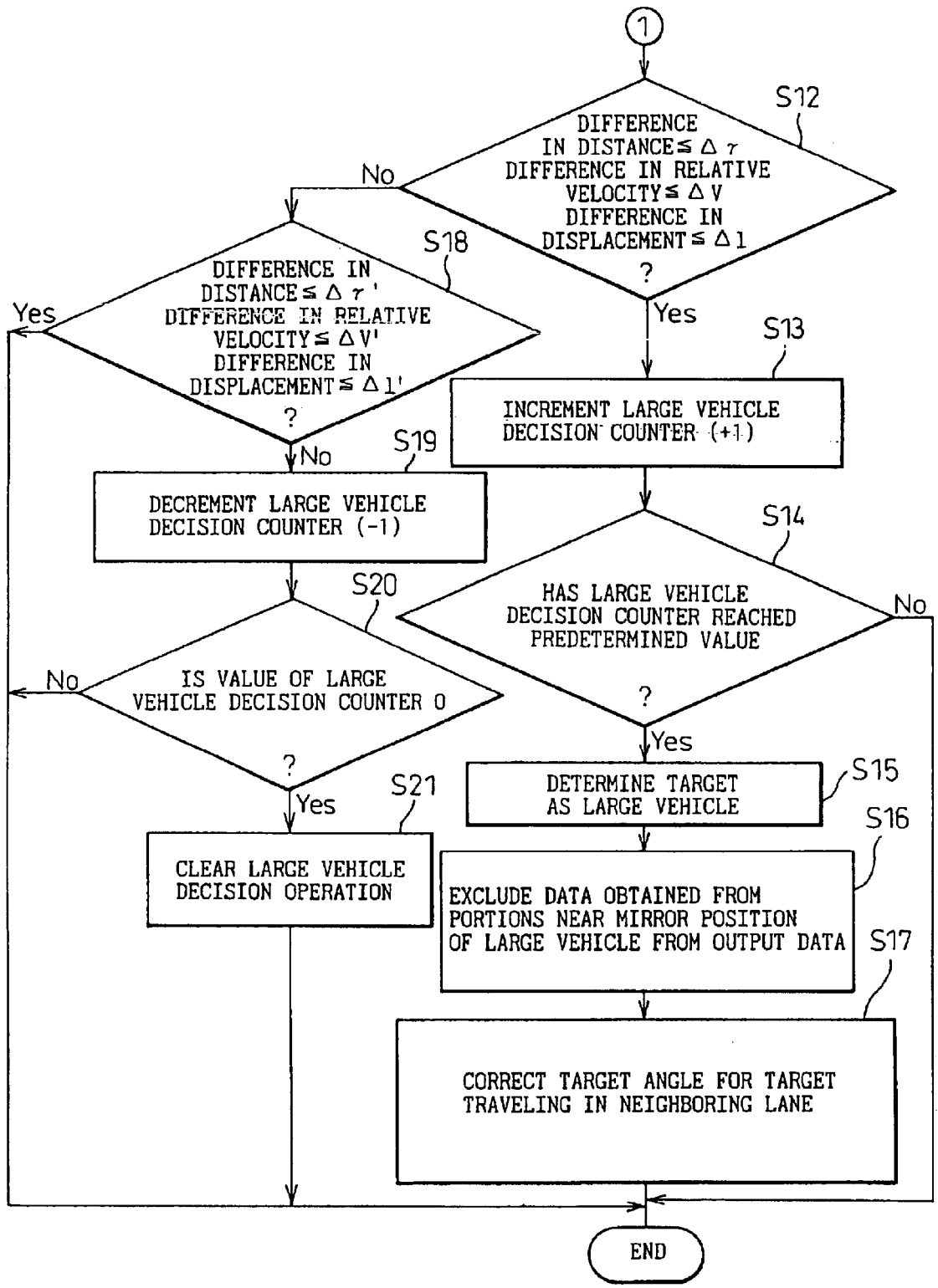

FIGS. 20A and 20B show an example of a flowchart illustrating the method of the present invention described in the first to third embodiments. In the flowchart, control or decision-making operations in the respective steps are performed in the signal processing circuit 3 shown in FIG. 1.

First, in S1, peaks having substantially the same frequency are grouped together. For any target located at the same distance from the radar-equipped vehicle, peak frequencies are substantially the same. For example, in the case of a large vehicle, beams are reflected from a plurality of differently located parts, and a plurality of peaks occur. In view of this, peaks having substantially the same frequency are grouped together.

Next, in S2, it is determined whether or not the reception level of each of the thus grouped peaks is equal to or higher than a predetermined value (threshold value). This decision step is included because the detected peak level is high if the target is a large vehicle. If the answer to S2 is Yes, then it is determined whether the detection angles of the peaks having substantially the same frequency lie within a predetermined range (S3). This determination is made by checking whether the detection angle range between the peaks at both ends of the peak group is within the predetermined range. If the answer to S3 is Yes, the process proceeds to S4, and it is determined if the difference in reception level between the peaks is within a predetermined value (threshold value). This step is performed to combine peaks between which the difference in reception level is relatively small. If the answer to S4 is Yes, re-grouping is performed. That is, the peaks are grouped together as representing the same target (S5).

Next, it is determined whether the difference in reception level between the re-grouped peaks is small or not (S6). The value with which the difference in reception level is compared here is set smaller than the value used in S4. If the difference between the peak reception levels is small, that is, if the reception levels are substantially the same (Yes), the probability is that a plurality of beams are reflected at the same intensity from the rear of a large vehicle such as a truck or a bus; therefore, of the re-grouped peaks, the center angle between the angle of the leftmost peak and the angle of the rightmost peak is taken as the angle representing the target (S7). On the other hand, if the difference between the reception levels of the re-grouped peaks is large, for example, if there is a large single peak with smaller peaks clustered around it, then the angle of the large peak, i.e., the maximum peak, is taken as the angle representing the target (S8).

On the other hand, if the answer to S2, S3, or S4, is No, that is, if the reception level is smaller than the predetermined value, or the detection angles of the peaks having substantially the same frequency are outside the predetermined range, or the difference in reception level is greater than the predetermined value, the possibility is that these peaks are from different targets or, if they are from the same target, they are the peaks from differently located parts, such as a front side mirror and a tail lamp, of the target. As a result, the process proceeds to S9 without re-grouping these peaks.

Next, in S9, for the re-grouped peaks or for the peaks grouped together in S1, the peak frequencies are paired up between the rising and falling portions, and in S10, the distance, relative velocity, detection angle, and the length of the lateral displacement from the lane in which the radar-equipped vehicle is traveling are obtained for each of the portions from which the plurality of beams have been reflected. The pairing is performed, for example, as explained in the description of the third embodiment. The length of the displacement is obtained as explained in the description of the second embodiment. Then, in S11, past data is taken over in order to maintain the target data continuity.

Next, in S12, it is determined whether the differences in distance, in relative velocity, and in the length of the lateral displacement from the lane in which the radar-equipped vehicle is traveling, existing between the respective reflecting portions, are within the respectively predetermined values (threshold values: $\Delta r$, $\Delta v$, and $\Delta 1$). If the differences in distance, in relative velocity, in angle, and in the length of the lateral displacement from the lane, existing between the respective portions of the target detected based on the respective peaks, are within the respectively predetermined values (Yes), the peaks can be considered as being peaks representing the same target, and a large vehicle decision counter is counted up. More specifically, the counter is incremented by 1 (S13). This counting is done each time the flow is processed. Then, in S14, it is determined whether the value of the large vehicle decision counter has reached a predetermined value. This step is necessary because the target considered to be a large vehicle in the first cycle of flow cannot always be determined as being a large vehicle, as there is a possibility that a plurality of peaks arising from two vehicles traveling ahead side by side, for example, happen to satisfy the conditions set in S12, leading to an erroneous decision that the peaks are from a large vehicle. If the counter value has reached the predetermined value in S14 (Yes), then the target is determined as being a large vehicle (S15). On the other hand, if the counter value has not yet reached the predetermined value (No), the current cycle of flow is terminated, and the process proceeds to the next cycle of flow.

Next, among the plurality of peaks that have been determined as being peaks arising from a large vehicle, the distances and relative velocities obtained from the peaks based on the beams reflected from the farther parts of the vehicle, such as front parts of the vehicle including, for example, a front side mirror or a nearby part, are excluded from output data (S16). In other words, the angle of the peak arising from the reflecting point located at the shortest distance from the radar-equipped vehicle is taken as the angle representing the target. Then, the target position obtained from the peak based on the beam reflected from the rear of the vehicle is determined as being the position of the control target. However, if it is determined that the target is located in the neighboring lane, the angle at which the large vehicle is detected is corrected and shifted outward as shown in FIG. 16A (S17), after which the flow is terminated. Whether the target is located in the neighboring lane or not can be determined in accordance with the method explained in the description of the second embodiment.

On the other hand, if the answer to S12 is No, that is, if the differences in distance, in relative velocity, in angle, and in the length of the lateral displacement from the lane, existing between the respective portions of the target detected based on the respective peaks, are not within the respectively predetermined value ranges, but are greater than the respectively predetermined values, the process proceeds to S18. Then, by expanding the predetermined ranges (threshold values), the respective differences are compared with new threshold values ($\Delta r'$, $\Delta v'$, and $\Delta 1'$). If the results of the comparisons in S18 do not satisfy the required conditions (No), the large vehicle decision counter is decremented by 1 (S19). Next, it is determined whether the value of the large vehicle decision counter is 0 (S20), and if the answer is Yes, the large vehicle decision operation is cleared (S21). If the conditions in S18 are satisfied (Yes), or if the counter value is not 0 in S20 (No), the current cycle of flow is terminated without clearing the large vehicle decision operation.

What is claimed is:

1. A signal processing method for a scanning radar wherein, of peaks generated based on a radar signal reflected from a target, peaks whose frequencies are approximately the same and whose received signal amplitudes are not smaller than a predetermined value are selected and, when a plurality of such peaks are selected, a center angle between the angle of the leftmost peak and the angle of the rightmost peak is obtained, and said obtained center angle is taken as an angle representing said target.

2. A signal processing method for a scanning radar as claimed in claim 1, wherein when the number of said selected peaks is two, the angle of a peak located within a predetermined angle range from the largest peak is obtained, and a center angle between the angle of said peak and the angle of said largest peak is obtained and is taken as the angle representing said target.

3. A signal processing method for a scanning radar as claimed in claim 2, wherein said center angle is taken as the angle representing said target, only when the difference between the received signal amplitude of said largest peak and the received signal amplitude of said peak located within said predetermined angle range from said largest peak is not greater than a predetermined value.

4. A signal processing method for a scanning radar as claimed in claim 2 wherein, when the difference between the received signal amplitude of said largest peak and the received signal amplitude of said peak located within said predetermined angle range from said largest peak is greater than a predetermined value, the angle of said largest peak is taken as the angle representing said target.

5. A signal processing method for a scanning radar as claimed in claim 1 wherein, when the number of said selected peaks is three or larger, said center angle is taken as the angle representing said target, only when the difference between the received signal amplitude of the largest peak of said three or more peaks and the received signal amplitude of each of the remaining peaks is not greater than a predetermined value.

6. A signal processing method for a scanning radar as claimed in claim 1 wherein, when the number of said selected peaks is three or larger, and when the difference between the received signal amplitude of the largest peak of said three or more peaks and the received signal amplitude of each of the remaining peaks is greater than a predetermined value, the angle of said largest peak is taken as the angle representing said target.

7. A signal processing method for a scanning radar as claimed in claim 1 wherein, when the number of said selected peaks is three or larger, and when the difference between the received signal amplitude of the largest peak of said three or more peaks and the received signal amplitude of each of a plurality of peaks taken from among the remaining peaks is not greater than a predetermined value, a center angle between the angle of the leftmost peak and the angle of the rightmost peak in a peak group consisting of said largest peak and said plurality of peaks is obtained, and said obtained center angle is taken as the angle representing said target.

8. A signal processing method for a scanning radar wherein, of peaks generated based on a radar signal reflected from a target, a plurality of peaks whose frequencies are approximately the same are selected, and pairing is performed on said plurality of peaks to detect a distance, relative velocity, and displacement length for each of reflecting points on said target, and wherein when the differences in said detected distance, relative velocity, and displacement length, existing between said reflecting points, are all within respectively predetermined values, said plurality of peaks are determined as being peaks representing the same target.

9. A signal processing method for a scanning radar as claimed in claim 8 wherein, of said plurality of peaks, the angle of the peak arising from the reflecting point whose detected distance is the shortest is taken as an angle representing said target.

10. A signal processing method for a scanning radar as claimed in claim 8, wherein said same target is determined as being a large vehicle.

11. A signal processing method for a scanning radar as claimed in claim 8 wherein, when said displacement length is greater than a predetermined value, it is determined that said target is traveling in a neighboring lane.

12. A signal processing method for a scanning radar as claimed in claim 8 wherein, when it is determined that said target is traveling in a neighboring lane around a curve, a correction is made so that said target is located in the center of said lane.

13. A signal processing method for a scanning radar wherein, of peaks generated based on a radar signal reflected from a target, peak signals whose received signal amplitudes are the largest in rising and falling portions, respectively, of said radar signal are extracted for pairing therebetween, after which peak signals, in which differences in angle and frequency relative to the respective peak signals whose signal reception levels are the largest are equivalent, are extracted from said rising and falling portions, respectively, for pairing therebetween.

14. A signal processing method for a scanning radar wherein, of peaks generated based on a radar signal reflected from a target, peak signals whose received signal amplitudes are the largest in rising and falling portions, respectively, of said radar signal are extracted for pairing therebetween, a range R1 defined by predetermined frequency and angle ranges containing the frequency and angle of each of said largest peak signals and a range R2 wider than said range R1 are determined, and said ranges R1 and R2 are searched for peaks having approximately the same angle in said rising and falling portions, respectively and wherein, when said peaks are located in said range R1, said peaks are paired up if the difference in frequency between said peaks is within a first predetermined range, but when said peaks are located in said range R2, said peaks are paired up if the difference in frequency between said peaks is within a second predetermined range which is smaller than said first predetermined range.

* * * * *